(12) United States Patent
Ziarko et al.

(10) Patent No.: US 12,022,835 B2
(45) Date of Patent: Jul. 2, 2024

(54) HOOD WITH CONDENSER FOR COMMERCIAL OVEN, PARTICULARLY COMBINATION STEAM-CONVECTION OVEN

(71) Applicant: "RETECH" SPÓŁKA Z OGRANICZONĄ ODPOWIEDZIALNOŚCIĄ, Mielec (PL)

(72) Inventors: Andrzej Ziarko, Mielec (PL); Boguslaw Ziarko, Murnau (DE); Krzysztof Ziarko, Mielec (PL)

(73) Assignee: "RETECH" SPÓŁKA Z OGRANICZONA ODPOWIEDZIALNOSCIA, Mielec (PL)

( * ) Notice: Subject to any disclaimer, the term of this patent is extended or adjusted under 35 U.S.C. 154(b) by 505 days.

(21) Appl. No.: 17/415,825

(22) PCT Filed: Dec. 2, 2019

(86) PCT No.: PCT/PL2019/050070
§ 371 (c)(1),
(2) Date: Jun. 18, 2021

(87) PCT Pub. No.: WO2020/130861
PCT Pub. Date: Jun. 25, 2020

(65) Prior Publication Data
US 2022/0132867 A1    May 5, 2022

(30) Foreign Application Priority Data
Dec. 18, 2018 (PL) .......................................... 428229

(51) Int. Cl.
*F24C 15/20* (2006.01)
*A21B 3/04* (2006.01)
(Continued)

(52) U.S. Cl.
CPC ............ *A21B 3/04* (2013.01); *F24C 15/2007* (2013.01); *F28B 1/06* (2013.01); *F28B 9/08* (2013.01);
(Continued)

(58) Field of Classification Search
CPC ...................................................... F28D 1/0472
See application file for complete search history.

(56) References Cited

U.S. PATENT DOCUMENTS

| 4,124,021 A | 11/1978 | Molitor |
| 9,557,082 B1 | 1/2017 | Colburn |
| 2011/0296856 A1* | 12/2011 | Hancock ............... F28D 1/0417 62/89 |

FOREIGN PATENT DOCUMENTS

| DE | 29708079 U1 | 7/1997 |
| EP | 0691513 A2 | 1/1996 |

(Continued)

*Primary Examiner* — Ko-Wei Lin
(74) *Attorney, Agent, or Firm* — Dickinson Wright PLLC; Andrew D. Dorisio

(57) ABSTRACT

The subject of present invention is a hood with a condenser for a commercial oven, particularly a combination steam-convection oven, comprising a housing, an air inlet for supplying cooling air from the outside, a fan drawing in the cooling air through the air inlet, a cooling air outlet for expelling the air drawn in by the fan, a steam condenser in the form of a heat exchanger with a coil having at least one inlet opening for supplying steam from the inside of a commercial oven to the coil and at least one outlet opening for draining the condensate coming out of the coil, characterised in that it comprises a radial fan (3) that blows cooling air radially onto the at least one coil (5) surrounding the fan (3), wherein the at least one coil (5) surrounding the fan having an external finning (6).

7 Claims, 6 Drawing Sheets

(51) Int. Cl.
*F28B 1/06* (2006.01)
*F28B 9/08* (2006.01)
*F28D 1/02* (2006.01)
*F28D 1/047* (2006.01)
*F28F 1/36* (2006.01)

(52) U.S. Cl.
CPC ........... *F28D 1/024* (2013.01); *F28D 1/0472* (2013.01); *F28F 1/36* (2013.01)

(56) References Cited

FOREIGN PATENT DOCUMENTS

| | | | |
|---|---|---|---|
| EP | 1106948 | A2 | 6/2001 |
| EP | 1530901 | A1 | 5/2005 |
| EP | 2384626 | A1 | 11/2011 |
| EP | 3299730 | A | 3/2018 |
| ES | 2310114 | A1 | 12/2008 |

\* cited by examiner

HOOD WITH CONDENSER FOR COMMERCIAL OVEN, PARTICULARLY COMBINATION STEAM-CONVECTION OVEN

TECHNICAL FIELD

The present invention relates to a hood cooperating with commercial ovens. More particularly, the invention relates to a hood with an air-air (steam) type heat exchanger for condensing steam, especially in baking combination steam-convection ovens (combi steamers).

PRIOR ART

A German utility model specification DE29708079 discloses a device for steam condensation, which includes a heat exchanger with a blower, connector pipes as well as inlet and outlet openings. In the heat exchanger, the flow path of the steam taken from the inside of the oven is separated from the flow path of the cooling air, forced into the heat exchanger by a fan drawing in air through a front hood. The heat exchanger contains obliquely placed lamella plates with different arrangement of horizontal channels, as well as sensors of temperature controllers. A Spanish Patent specification ES2310114 discloses also a device for condensing steam that is placed on the back wall of a baking oven, in which steam is drawn in from the inside of the oven by means of a fan, whereafter it is directed to the condenser in the form of a coil made of smooth pipes, and then goes to the final reservoir, wherefrom water is discharged outside.

European patent application EP1530901A1 discloses a device for condensing substances from the exhaust air from a baking device, in which a heat exchanger equipped with obliquely placed condensation plates is located inside a cuboid casing. Fans drawing air in are located in front of the exchanger, while steam from the oven inside is fed through a duct, and water remaining after condensation comes out of the exchanger through an outlet pipe.

Known hoods generally comprise a heat exchanger whose pipes are arranged in a vertical or horizontal direction. This results in an uneven air flow through the heat exchanger.

SUMMARY OF THE INVENTION

A hood with a condenser for a commercial oven, in particular a combination steam-convection oven, according to the invention, comprises a housing, an air inlet for supplying cooling air from the outside, a fan drawing in the cooling air through the air inlet, an air outlet for expelling outside the air drawn in by the fan, a steam condenser in the form of a heat exchanger with a coil having at least one inlet opening for supplying steam from the inside of a commercial oven to the coil and at least one outlet opening for draining the condensate coming out of the coil. According to the invention, the hood comprises a radial fan that blows cooling air radially onto at least one coil surrounding the fan, the at least one coil surrounding the fan having an external finning.

Preferably, the external finning is a helical surface essentially with a square thread shape. In another embodiment of the invention, the external finning may be in the form of rings arranged along the pipe forming the coil.

The radial fan is preferably equipped with a rotor with a substantially vertical axis of rotation.

The coil surrounding the fan may have the shape of a pipe coiled in a helix, the axis of which is substantially vertical, the inlet opening being located in the upper part of the heat exchanger above the outlet opening for the gravitational condensate flow in accordance with the direction of steam flow through the coil.

In one embodiment of the invention, the at least one inlet opening and the at least one outlet opening are connected by a collector, which is divided from above by a baffle extending downwards to a condensate tray and having from below a connector inserted into the space inside the collector on the side of the at least one inlet opening so that the upper part of the connector defines the overflow level for condensate coming out through the at least one outlet opening, wherein the baffle together with the condensate accumulating in the tray prevent the steam from escaping through the at least one outlet opening back to the at least one inlet opening.

The collector is preferably connected to an at least one exhaust funnel, in which the uncondensed steam, after passing through the coil, is expelled outside, the connection of this exhaust funnel being located on the side of the at least one outlet opening and above the overflow level.

Advantageous Effects of the Inventions

The use of a radial fan surrounded by a heat exchanger in the form of a coiled, externally finned pipe with a helical shape allows the air from the fan to be blown radially and directly onto the heat exchanger. Thanks to this, the heat exchanger is supplied by the fan evenly, and the external fins increase the heat exchange surface and ensure a more stable air flow.

Due to appropriate arrangement and configuration of the components in the hood, the air entering the device passes through a filtration section, and then, still cool (at ambient temperature), passes through the radial fan and flows radially out, evenly feeding the heat exchanger, which is wrapped spirally around the fan. In addition, positioning the radial fan in the airflow upstream the heat exchanger protects it from overheating.

The use of a heat exchanger with external fins having the form of a helical surface (e.g. thread) provides direct drainage of the condensate that condensates from the heat exchanger to the oven or outside. The heat exchanger is supplied with the steam at the upper connection, whereby water condensing from the steam flows downwards by gravity and in the direction of the steam flow.

In addition, the heat exchanger so constructed is cheaper in manufacturing than the known heat exchangers in other extractors while maintaining the same condensation efficiency.

BRIEF DESCRIPTION OF THE DRAWINGS

In the following the invention will be illustrated in a preferred embodiment with reference to the attached drawings, wherein.

DETAILED DESCRIPTION OF A PREFERRED
EMBODIMENT OF THE INVENTION

Figure 1:
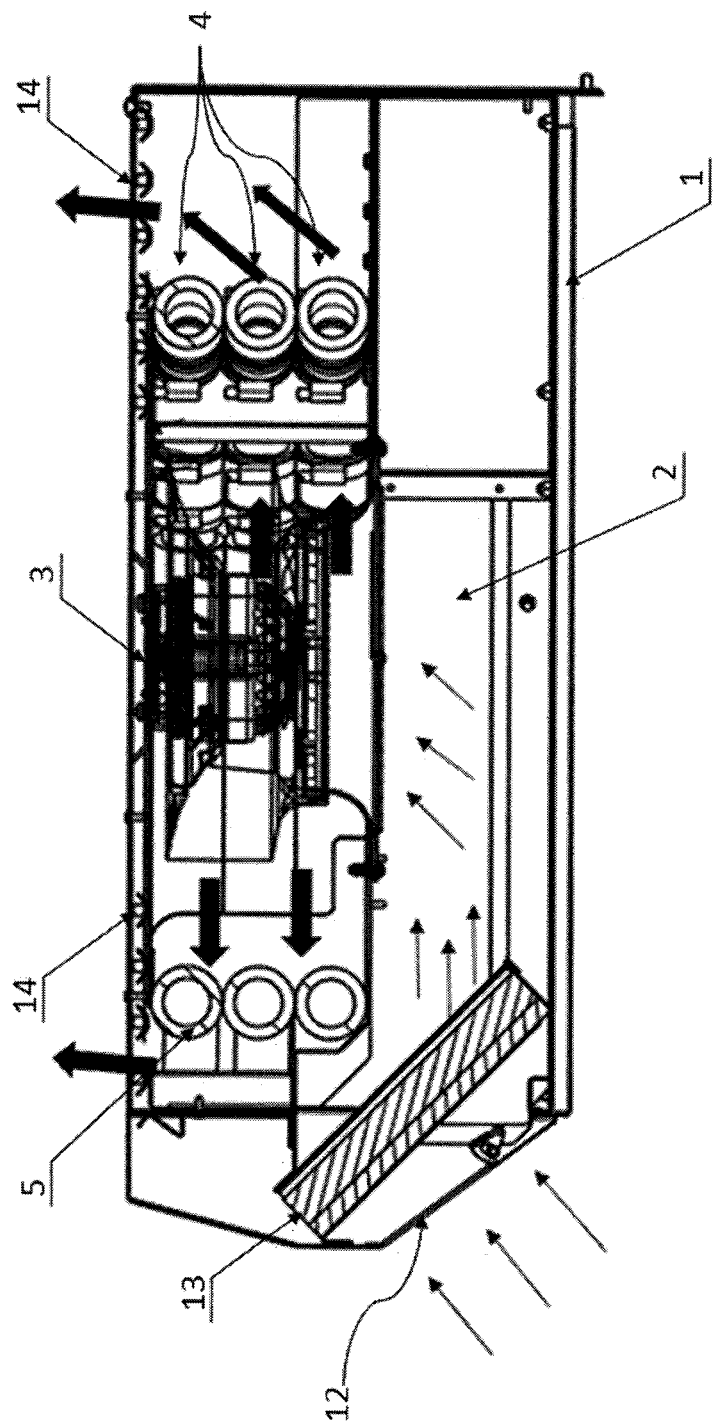
FIG. 1 shows the hood in a side cross-sectional view (arrows indicate the air flow)
Figure 2:
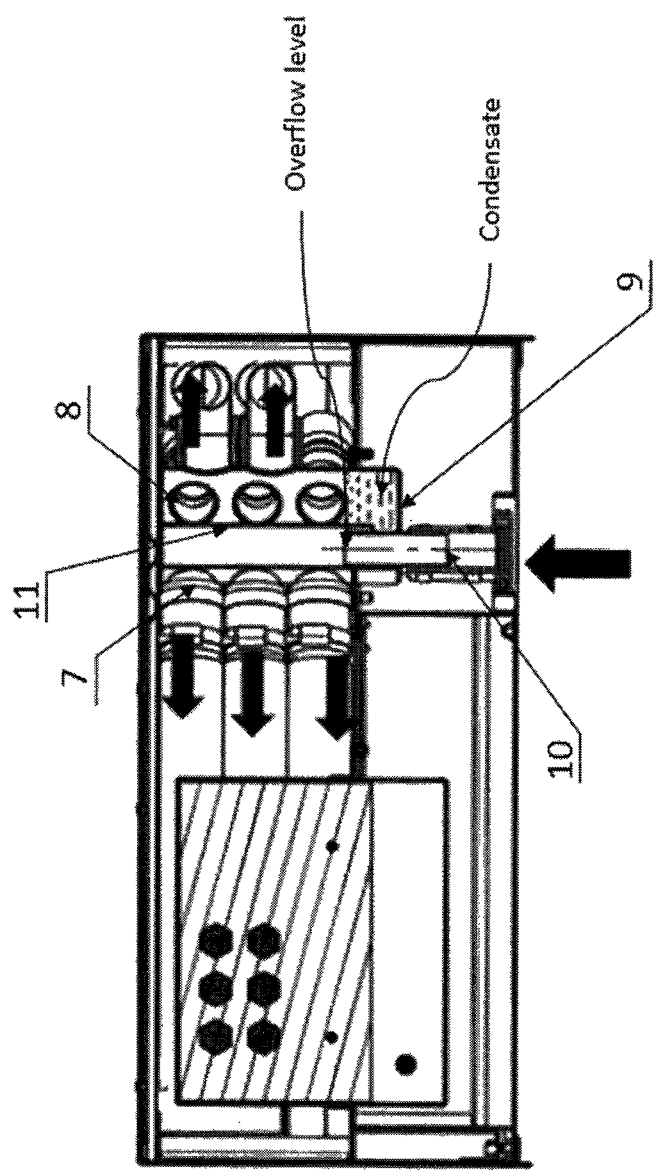
FIG. 2 shows the hood in a back view in cross-section through the collector connecting the coils (arrows indicate the steam flow)
Figure 3:
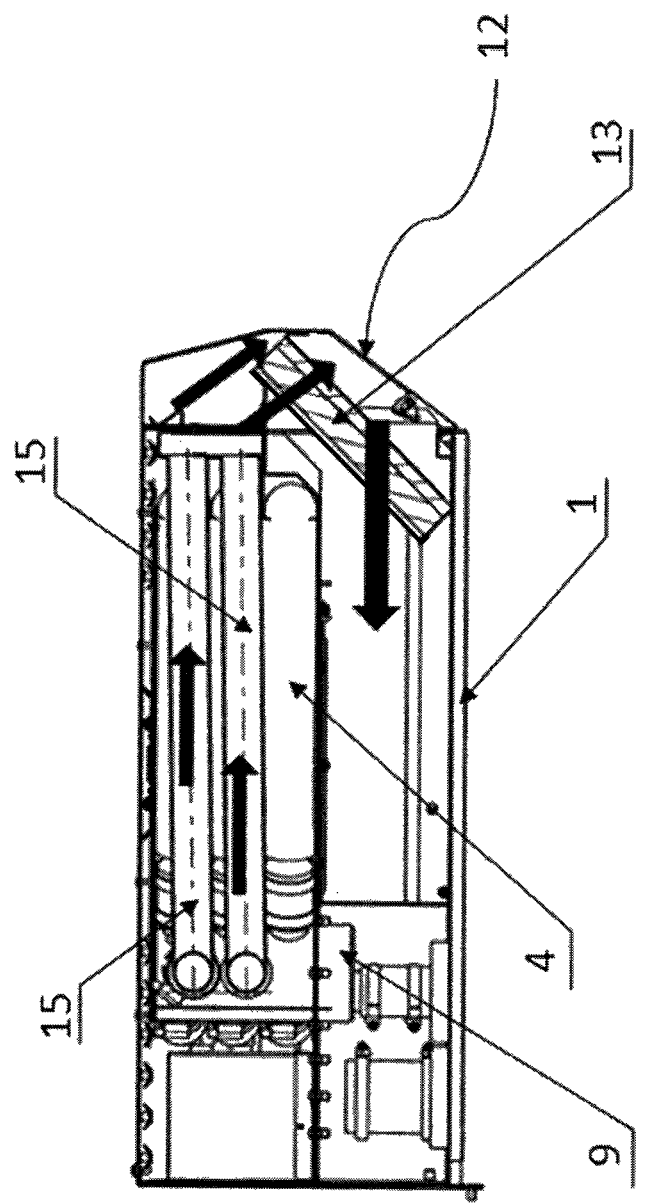
FIG. 3 shows the hood in a second side view (arrows indicate the flow of uncondensed steam residues)

FIGS. 1-3 show the hood cooperating with a combi steamer. The hood has a generally rectangular housing 1 with a front hood 12 comprising an air inlet with installed filters 13. Behind the air inlet there is a suction chamber 2. Above the suction chamber 2 there is a radial fan 3 with a rotor with a vertical axis of rotation. A steam condenser in the form of an air-air (steam) heat exchanger 4 is arranged around the radial fan 3. The heat exchanger 4 is in the form of a coil 5 shaped as a coiled cylindrical pipe, equipped with an inlet opening 7 for supplying steam from the oven inside and an outlet opening 8 for draining the condensate. The upper part of the housing 1 comprises exhaust vents 14 through which the cooling air drawn in by the radial fan 3 is expelled.

Figure 4:
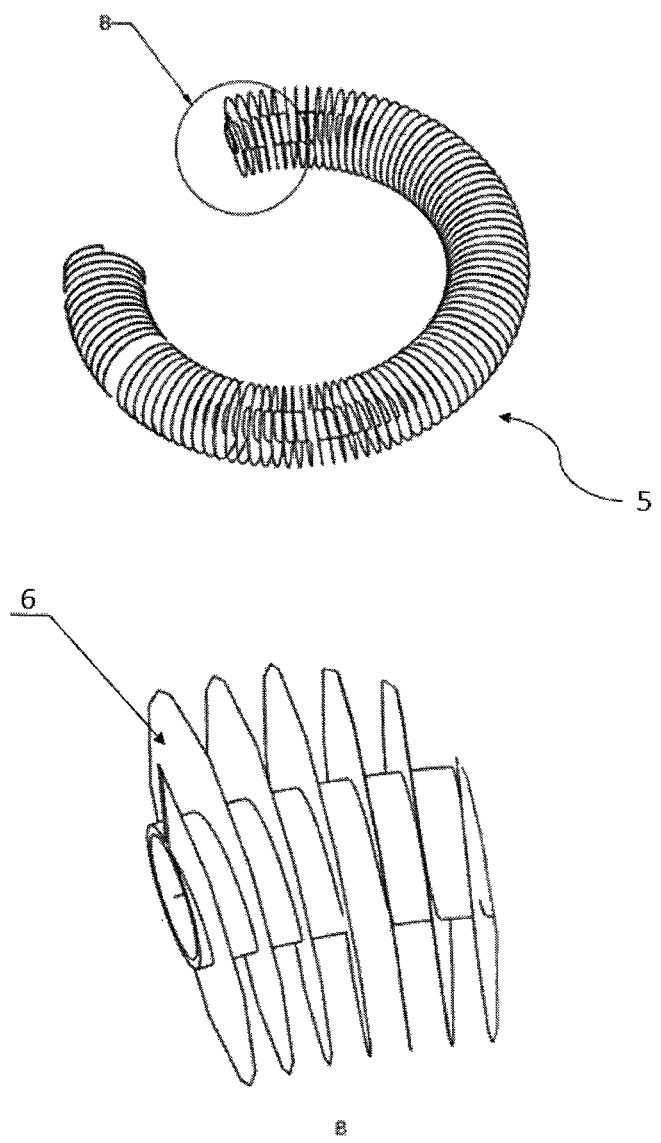
FIG. 4 shows the coil with external finning and the magnified helical surface (detail B)
Figure 5:
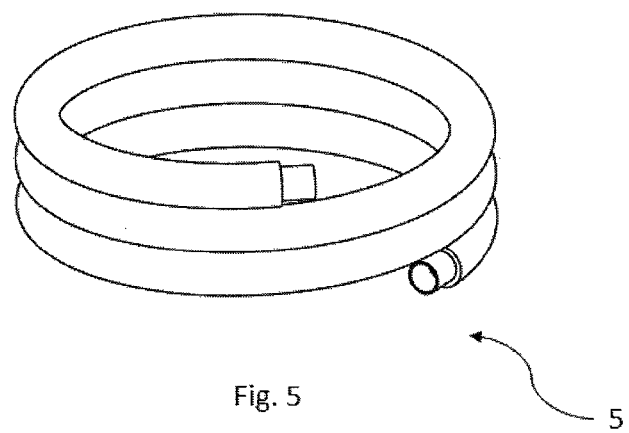
FIG. 5 shows the heat exchanger in the form of a continuous coil coiled in a helix.
Figure 6:
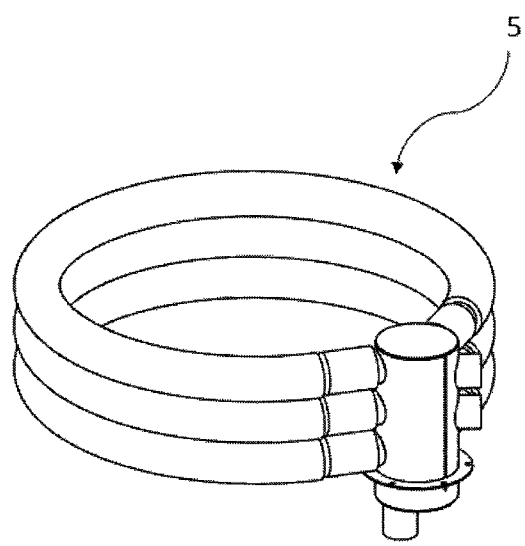
FIG. 6 shows the heat exchanger composed of three separate coils connected via a common collector.

The coil 5 shown in FIG. 4 is in the form of a cylindrical pipe with an external finning 6 shaped as a square thread or in the form of rings. Preferably, the coil 5 surrounding the radial fan 3 is shaped as a pipe coiled in a helix, and its inlet opening 7 is arranged above the outlet opening 8 and is located in the upper part of the heat exchanger 4. Such shape of the heat exchanger 4 results in gravitational condensate and steam flows from the inlet opening 7 towards the outlet opening 8. The pitch of the coil helix 5 can be from 0 to 1.5 of the coil diameter. In the case the coil 5 is not coiled in a helix (FIG. 6) and the pitch is 0 (or the coil 5 is coiled in a helix, but with a very small pitch, smaller than the diameter of the coil), the heat exchanger 4 can be composed of one or more such elements connected by a common collector. However, when the coil 5 is coiled in a helix (FIG. 5), with a pitch equal to or greater than the diameter of the coil 5, preferably from 1 to 1.5 in diameter, then the heat exchanger 4 is in the form of a multi-turn coil 5 in the form of one, continuous element.

In the presented example, the heat exchanger 4 consists of three independent coils 5 connected by a common collector 9, but the heat exchanger 4 can also have the form of a coil 5 made as a single continuous section of pipe.

Figure 7:
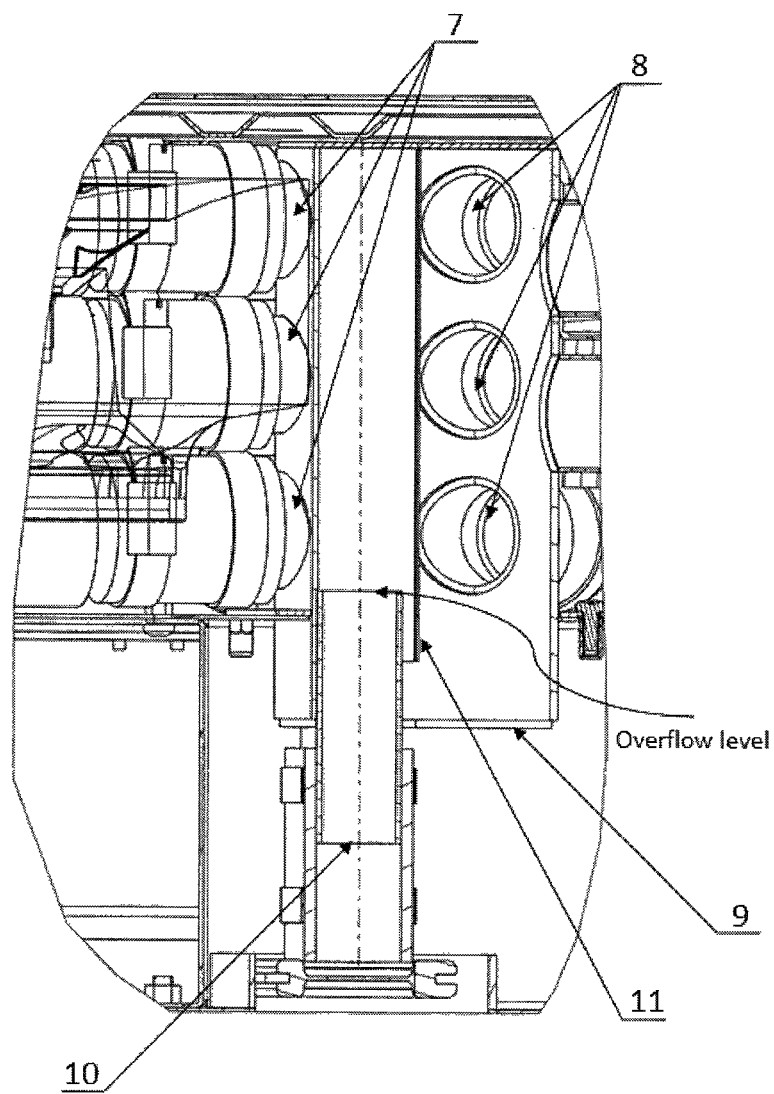
FIG. 7 shows the collector connecting the inlet and outlet openings of the heat exchanger coils.

The steam supplying inlet openings 7 and the outlet openings 8 through which the condensate or possibly the uncondensed steam residues escape, are connected by a cylindrical common collector 9, arranged vertically, which is illustrated in more detail in FIG. 7. The collector 9 is divided from above by a baffle 11 extending downwards to the condensate tray at the bottom of the collector 9. The baffle 11 divides the collector 9 into two spaces separating the inlet openings 7 from the outlet openings 8. In other words, on one side of the baffle 11 there are only inlet openings 7, and on the other side the outlet openings 8 only. In the bottom of the collector 9 a connector 10 is provided, which enters the space inside the collector 10 on the side of the inlet openings so that the upper part of the connector 10 defines the overflow level for the condensate coming out through the outlet openings 8 and accumulating in the tray on the collector bottom 9. The baffle 11 together with the condensate accumulating in the tray prevent the steam coming out through the outlet openings 8 from getting back into the inlet openings 7 for the steam coming out from the oven. In addition, the collector 9 is connected to exhaust funnels 15, through which the uncondensed steam, after passing through the coil 5, is discharged outside, wherein the exhaust funnel connection 15 is provided in the collector 9 on the side of outlet openings 8, above the overflow level.

The air entering the hood passes through the filters 13 installed on the air inlet in the front hood 12, and then still cool (at ambient temperature) passes through the radial fan 3 and comes out of it, evenly feeding the heat exchanger 4, which is wrapped spirally around the radial fan 3. Positioning the radial fan 3 in the airflow upstream the heat exchanger 4 protects it from overheating.

The invention claimed is:

1. A hood for a commercial oven, the hood comprising a housing, an air inlet for supplying cooling air from outside, a cooling air outlet for expelling the cooling air drawn into the air inlet, a steam condenser comprising a heat exchanger with a coil having an inlet opening for supplying steam from the inside of the commercial oven to the coil and an outlet opening for draining condensate from the coil, and a radial fan for blowing the cooling air radially onto the coil surrounding the radial fan, the coil having an external fin.

2. The hood according to claim 1, wherein the external fin comprises a helical surface.

3. The hood according to claim 2, wherein the external fin comprises rings along the pipe forming the coil.

4. The hood according to claim 1, wherein the radial fan with comprises a rotor with a substantially vertical axis of rotation.

5. The hood according to claim 1, wherein the coil surrounding the radial fan comprises a pipe coiled in a helix having a substantially vertical axis, the inlet opening being located in an upper part of the coil above the outlet opening for the condensate in accordance with a direction of steam flow through the coil.

6. The hood according to claim 1, wherein the inlet opening and the outlet opening are connected by a collector, which is divided by a baffle extending downwards to a condensate tray and having a connector inserted into the space inside the collector on a side of the inlet opening so that an upper part of the connector defines an overflow level for condensate coming out through the outlet opening, wherein the baffle together with the condensate accumulating in the tray prevent the steam from escaping through the outlet opening back to the inlet opening.

7. The hood according to claim 6, wherein the collector is connected to an exhaust funnel, in which the steam, after passing through the coil, is expelled outside, the connection of the exhaust funnel being located on a side of the outlet opening and above the overflow level.

\* \* \* \* \*